United States Patent Office 3,542,716
Patented Nov. 24, 1970

3,542,716
POLYMERIZATION PROCESS
Albert R. Muller, Tallmadge, Ohio, assignor to The Goodyear Tire & Rubber Company, Akron, Ohio, a corporation of Ohio
No Drawing. Filed Jan. 30, 1968, Ser. No. 701,561
Int. Cl. C08d 9/12
U.S. Cl. 260—27                 5 Claims

ABSTRACT OF THE DISCLOSURE

A process is disclosed of polymerizing butadienes by means of a lithium based catalyst in which the polymer chain growth of the polybutadiene is terminated with polyfunctional terminators having three or more functional or reactive groups. This type of termination produces a polybutadiene having branched chains which greatly reduce the cold flow tendencies of finished polybutadiene.

---

This invention relates to the preparation of polybutadiene by means of a lithium based catalyst. It also relates to the preparation of polybutadiene which is very light in color and possesses reduced cold flow properties or tendencies. More specifically, it relates to a method for terminating the polymerization chain growth reaction of lithium catalyzed polybutadiene by use of polyfunctional terminators containing three or more reactive groups.

This invention will be described in connection with the solution polymerization of butadiene 1,3 in an inert liquid organic medium to form a high molecular weight polybutadiene by means of a lithium based catalyst, particularly lithium alkyls.

Desirable features of a finished polymer of polybutadiene include a fairly high molecular weight, a light color and a translucent or transparent quality so that the polymer is, in a sense, "water-white." Methods are known for producing such polymers. However, the polybutadienes produced by lithium based catalysts while possessing a good color have a tendency toward cold flow.

The term "cold flow" is meant to describe a property of a polymer which has a tendency to deform upon standing rather than to retain whatever shape it was placed in. For instance, a polymer having a high degree of "cold flow," when formed into a bail of rectangular or square shape, does not retain that shape but instead tends to seek a level in a manner similar to that of an unconfined liquid all be it, not necessarily to the extent that unconfined liquids do. It is believed that this tendency to cold flow of these high molecular weight acceptable-color polybutadienes, produced by means of a lithium-based catalyst, is due, at least in part, to the fact that the chain growth reaction has been terminated with a monofunctional group such as an alcohol. These previous processes result in polymers which exhibit a high degree of cold flow upon storage. It is readily apparent that cold flow in such polymers result in loss of material, contamination and sticking together of individual bails or packages and is, thus, an undesirable feature.

It has been discovered that an improvement in the cold flow properties of polybutadiene produced by the solution polymerization of butadiene 1,3 by means of lithium based catalysts can be effected when the chain growth reaction is terminated by the use of materials containing polyfunctional end groups.

The polymerization of polybutadiene by means of lithium based catalysts is well known and straightforward. These polymerizations can take place in bulk, but usually take place while the butadiene is dissolved in an inert solvent and are most often solution polymerizations. Suitable inert solvents are aromatic hydrocarbons such as benzene, toluene and the like, saturated aliphatic hydrocarbons such as butane, hexane, pentane, octane and the like. Other suitable solvents are kerosene, diesel oil and other inert hydrocarbon media. Substituted hydrocarbons may also be employed provided that they are inert to the lithium based catalyst employed and the polymerization itself. The ratio of the butadiene to the inert solvent can vary rather widely and are usually employed from a volume ratio of butadiene/solvent of from about 1/1 to about 1/20 with from about 1/2 to about 1/4 being more preferred.

The polymerization may be carried out under rather a wide range of temperature conditions, as low as the freezing point of the polymerization mixture to extremely high temperatures of 100° C. or higher. However, it is usually preferred to operate the temperatures ranging from about 30° C. to about 65° C.

The pressure employed are not particularly significant, however, it is usually advantageous to employ a positive pressure in the polymerization system to prevent the entry of moisture and air into the system. This can be done by choice of either temperatures and proper solvents to give a positive vapor pressure or it may be done by pressuring the system with some inert gas, such as nitrogen. As is indicated, it is usually desirable to operate using moisture and air-free techniques, as the lithium based catalyst systems are sensitive to these materials.

The catalyst employed in these polymerizations may be any lithium based catalyst. Representative of such catalysts are lithium metal, hydrocarbon lithium compounds, such as that represented by R—Li or Li—R—Li, where R represents a hydrocarbon radical. Representative of such compounds are, of course, lithium metal, alkyl lithium, such as amyl lithium, allyl lithium and butyllithium; polylithium compounds such as 1,5-naphthalene dilithium and tetramethylene dilithium. Other representative examples are phenyllithium, benzyllithium and cyclohexyllithium and various other hydrocarbon lithium compounds.

The amount of catalyst employed, of course, will depend on a number of factors such as the rate desired, the temperature employed and the purity of the polymerization system, as well as the molecular weight of the polybutadiene desired. It is believed that the number of growing polymer chains and thus, the rate of reaction is dependent on the number of catalyst species present in the system. Also, the molecular weight of the finished polybutadiene varies inversely with the number of active catalyst species and the polybutadiene chain grows from each active lithium or lithium hydrocarbon species without chain termination occurring before the addition of some chain terminator. Thus, the optimum amount of catalyst employed is also dependent on the degree of polymerization and the molecular weight desired. The catalyst concentration is usually expressed in parts by weight of catalyst per hundred parts by weight of monomer (p.h.m.). Thus, it appears that while the catalyst concentrations may range from about 0.05 to about 5.0 p.h.m., a more preferable range appears to be between about 0.3 and 0.6 p.h.m.

The polyfunctional chain growth terminators which contain three or more reactive end groups which are added as the stoping agent in the polymerization of butadiene with lithium based catalysts of this invention, are added to the polymerization mixture when the desired level of polymerization is achieved. These polyfunctional terminators can be organic halides, hydroxy compounds, amines, mercaptans, and the like. Most any material containing three functional or reactive groups can be employed.

Representative examples of suitable polyfunctional chain terminators are hexachlorobenzene, triisopropanolamine, tetrachloroethane, chloroform, tetraethylenepentamine and the like.

These polyfunctional chain terminators may be added in any form, however, since usually the polymerization is a solution or suspension polymerization, it is preferred to add these terminators as solutions in the same inert solvent or one that is miscible with the polymerization mixture.

The amount of the polyfunctional terminator employed is usually less than the theoretical number of catalyst species in the lithium catalyst. Since the reason to add the polyfunctional chain terminators is to cause some crosslinking, there should be a sufficient terminator to cause this crosslinking or chain linking to take place. The actual amount of polyfunctional chain terminator added is related to the amount of lithium as Li employed as the catalyst. It can be seen that if sufficient amount of terminator is added to react with every mole of lithium, no crosslinking will take place. Thus, the amount of chain terminator is also based on the number of functional groups contained in its molecule. This may be expressed as functional or reactive groups per mole of lithium. The maximum crosslinking would be obtained when one employs one functional group per mole of lithium. Somewhere between 25% and 100% of functional groups per mole of lithium is usually the amount employed to produce a polybutadiene containing improved cold flow characteristics.

The practice of this invention is further illustrated by reference to the following example which is intended to be illustrative rather than restrictive of the scope of the invention.

EXAMPLE I

A continuous butadiene polymerization was conducted using benzene as a solvent. The butadiene concentration in benzene was 16.5 weight percent. As a catalyst, n-butyllithium in a concentration of 0.06 part by weight per hundred parts of butadiene was employed and the reaction temperature was 100° F. When the desired conversion to polybutadiene was obtained (about 70%), the polymerization mixture was contacted with a dilute solution of a number of polyfunctional or polyreactive chain terminating agents in benzene. The particular chain terminating agent employed is listed in the table below. The first run employing isopropanol is considered a control as isopropanol alcohol contains only one reactive group. The amount of the various chain terminating agents employed was computed on the number of reactive groups contained in them and in these experiments the amount employed was one reactive group per mole of lithium employed as the catalyst.

After the polybutadiene was chain terminated, 1.2 parts per hundred parts by weight of polybutadiene of a butylated octyl phenol was added as an antioxidant. These polymers were then isolated and dried using conventional rubber techniques.

The improvement in the cold flow characteristics were determined as follows: The polymers were compressed into uniform cubes. The height of these cubes was measured immediately. These cubes were then allowed to sit at room temperature. After 21 hours and 93 hours had elapsed, the height was again measured. The decrease in height, reported in column 4, is an indication of the cold flow characteristics of the polymers. The smaller the decrease in height, the greater the improvement in the cold flow characteristics. The results are reported in the table below.

TABLE I

| Run No. | Reagent | Time interval, hrs. | Decrease in height |
|---|---|---|---|
| 1 | Isopropanol | 21 | .375 |
|  |  | 93 | .453 |
| 2 | Tetrachloroethane | 21 | .094 |
|  |  | 93 | .281 |
| 3 | Glycerine | 21 | .250 |
|  |  | 93 | .375 |
| 4 | Triisopropanolamine | 21 | .125 |
|  |  | 93 | .297 |
| 5 | Ethylene diamine tetraacetic acid | 21 | .156 |
|  |  | 93 | .344 |
| 6 | Rosin acid | 21 | .156 |
|  |  | 93 | .328 |
| 7 | Carbon tetrachloride | 21 | .250 |
|  |  | 93 | .375 |
| 8 | Diethylene triamine | 21 | .094 |
|  |  | 93 | .313 |
| 9 | Dicyclohexylamine | 21 | .047 |
|  |  | 93 | .203 |
| 10 | Tetraethylene pentamine | 21 | .000 |
|  |  | 93 | .109 |

While certain representative embodiments and details have been shown for the purpose of illustrating the invention, it will be apparent to those skilled in this art that various changes and modifications may be made therein without departing from the spirit or scope of the invention.

What is claimed is:

1. In the process of preparing polybutadiene which comprises the solution polymerization of butadiene 1,3 by means of lithium based catalyst, the improvement which comprises terminating the chain growth reaction with a chain terminating agent selected from the group consisting of tetrachloroethane, diethylene triamine, dicyclohexylamine and tetraethylenepentamine.

2. The process according to claim 1 in which the chain terminating agent is tetrachloroethane.

3. The process according to claim 1 in which the chain terminating agent is diethylenetriamine.

4. The process according to claim 1 in which the chain terminating agent is dicyclohexylamine.

5. The process according to claim 1 in which the chain terminating agent is tetraethylene pentamine.

References Cited

UNITED STATES PATENTS 3,182,050  10/1962  Irvin _____ 260—94.2
3,331,826  7/1967  Talcott _____ 260—80.7

FOREIGN PATENTS 666,218  7/1963  Canada.

DONALD E. CZAJA, Primary Examiner

W. E. PARKER, Assistant Examiner

U.S. Cl. X.R.

260—80.7, 94.2, 94.7